UNITED STATES PATENT OFFICE.

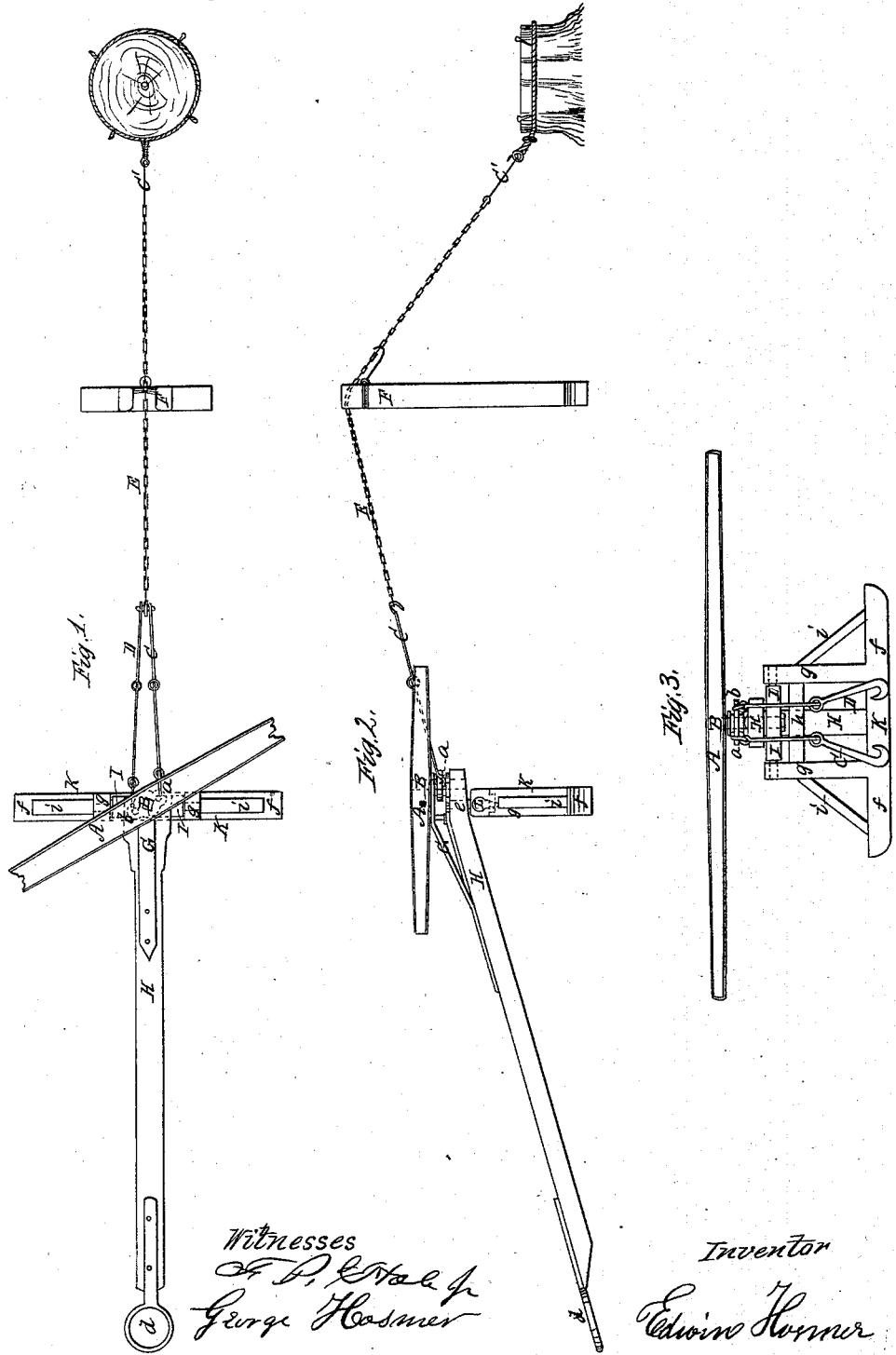

EDWIN HOSMER, OF BEDFORD, MASSACHUSETTS.

STUMP-EXTRACTOR.

Specification of Letters Patent No. 26,498, dated December 20, 1859.

*To all whom it may concern:*

Be it known that I, EDWIN HOSMER, of Bedford, in the county of Middlesex and State of Massachusetts, have invented an Improved Stump-Extractor; and I do hereby declare that the same is fully described and represented in the following specification and the accompanying drawings, of which—

Figure 1, denotes a top view; Fig. 2, a side elevation of it, and Fig. 3, a front view of the devices for supporting the working lever.

The nature of my invention consists of an improved lever, and hook stump extractor as constructed with a combination of a holding tongue and supporter and with such united by a universal joint in manner and so as to operate or enable the parts to operate as hereinafter specified.

In the drawings, A denotes the lever which is supported by an upright shaft, B, carrying two projections or arms, $a$, $b$, which extend in opposite directions from it. These arms are connected respectively by chains or jointed rods, to two hooks, C, D, which when the lever is turned horizontally, first in one direction and next in the other, are to be alternately hooked into a chain, E, carried over the top of shears, F, and so as to depend therefrom as shown in Fig. 2. The lower end of the chain is furnished with a hook, C′, to enable the chain to be connected with a stump preparatory to its extraction from the ground.

The fulcrum shaft, B, of the lever is supported by means of a carrier or frame, G, fixed on the top of a long holding tongue, H, which projects backward from the lever, and has at its rear end, an eye, $d$, or other suitable appliance, by which or by a chain or rope, the tongue may be applied to or connected with a stump, tree, or a post projecting from the ground.

The tongue, H, near its front end rests on a rocker shaft, I, and is connected thereto by a transom bolt, $e$, so as to be capable of being turned in a horizontal direction on the rocker shaft.

A supporter or stand, K, composed of a bed timber, $f$, two posts $g$ $g$, a connecting piece $h$, and struts, $i$ $i$, (arranged as shown in Fig. 3,) serves to give support to the journals of the rocker shaft, which is disposed between the posts of the supporter as shown in the drawings. The shaft can revolve or turn laterally and thus the shaft and transom bolt constitute a universal joint, by which the supporter, K, can be tipped and turned so as to adapt the supporter to advantage to uneven or sloping ground so that by means of the tongue and supporter so connected, the supporter may be adjusted out of the way of rocks or, stumps, and made to rest on ground having any ordinary inclination. This in operating the machine or preparing it for being put in operation is a matter of great convenience.

By means of the tongue and its supporter, the fulcrum of the lever can be moved about in a circle while the rear end of the tongue is applied to a stump or post, and thus the extractor can be easily moved from one stump to another within the circle of its movement the instrument readily adjusting itself to the ground on which it may be placed.

I do not claim the lever and its two hooks to operate on a chain led over shears; nor do I claim supporting such lever by a chain looped around a stump or object, but What I do claim is—

The improved lever and hook stump extractor, as constructed with the combination of the holding tongue, H, and its supporter K, and with each united by a universal joint, in manner and so as to enable the parts to operate substantially as specified.

EDWIN HOSMER.

Witnesses:
T. B. HOSMER,
P. W. CHAMBERLIN.